US009454908B2

(12) United States Patent
Moune et al.

(10) Patent No.: US 9,454,908 B2
(45) Date of Patent: Sep. 27, 2016

(54) METHOD AND SYSTEM FOR MANAGING AUTOMATIC GUIDANCE OF AN AIRCRAFT DURING A COMPLETE ENGINES FAILURE

(71) Applicant: AIRBUS OPERATIONS S.A.S., Toulouse (FR)

(72) Inventors: Marie-Claire Moune, Tournefeuille (FR); Jean Muller, Tournefeuille (FR); Stéphane Cote, Toulouse (FR)

(73) Assignee: AIRBUS OPERATIONS S.A.S., Toulouse (FR)

( * ) Notice: Subject to any disclaimer, the term of this patent is extended or adjusted under 35 U.S.C. 154(b) by 185 days.

(21) Appl. No.: 14/049,291

(22) Filed: Oct. 9, 2013

(65) Prior Publication Data
US 2014/0107873 A1 Apr. 17, 2014

(30) Foreign Application Priority Data

Oct. 12, 2012 (FR) ...................................... 12 59746

(51) Int. Cl.
*G08G 5/02* (2006.01)
*G05D 1/00* (2006.01)
(52) U.S. Cl.
CPC .............. *G08G 5/02* (2013.01); *G05D 1/0072* (2013.01)
(58) Field of Classification Search
None
See application file for complete search history.

(56) References Cited

U.S. PATENT DOCUMENTS

| 3,715,093 | A  | * | 2/1973  | Van Dyke | .................... 244/76 B |
| 8,155,803 | B2 |   | 4/2012  | Ferro |   |
| 8,543,264 | B1 | * | 9/2013  | Tomas | ............................. 701/5 |
| 2003/0098773 | A1 | * | 5/2003 | Chakravarty | ........ G08G 5/0013 340/3.1 |
| 2004/0031880 | A1 | * | 2/2004 | Stemme | ................ B64C 39/024 244/55 |
| 2008/0243315 | A1 | * | 10/2008 | Ferro | ............................... 701/7 |
| 2010/0096491 | A1 | * | 4/2010 | Whitelaw | ................ A63K 3/00 244/15 |
| 2012/0245746 | A1 | * | 9/2012 | Swearingen et al. | ......... 700/287 |

OTHER PUBLICATIONS

French Searching Authority, French Search Report for Application No. FR1259746 Mailed Jun. 20, 2013.
Wu, et al., "Dynamic Programming for Trajectory Optimization of Engine-Out Transportation Aircraft", Control and Decision Conference (CCDC), 2012 24th Chinese, IEEE, May 23, 2012, pp. 98-103, XP032203630, ISBN: 978-1-4577-2073-4.

(Continued)

*Primary Examiner* — John R Olszewski
*Assistant Examiner* — Nicholas K Wiltey
(74) *Attorney, Agent, or Firm* — Lorenz & Kopf, LLP

(57) ABSTRACT

A method and system for managing automatic guidance of an aircraft during a complete engine failure. Said system includes means for monitoring engines so as to be able to detect a complete failure of the engines; means for detecting whether the aircraft is in flight; means for detecting whether the aircraft is in a different guidance mode from a guidance mode configured to make the aircraft descend with a reduced engine thrust and a fixed speed; and control means for automatically bringing guidance means of the aircraft into a guidance configuration compatible with the situation associated with the complete failure of the engines.

14 Claims, 1 Drawing Sheet

(56) References Cited

OTHER PUBLICATIONS

Adler et al., "Optimal Flight Paths for Engine-Out Emergency Landing", Control and Decision Conference (CCDC), 2012 24th Chinese, IEEE, May 23, 2012, pp. 2908-2915, XP03220476, ISBN: 978-1-4577-2073-4.

Carbaugh et al., "Airplane Upset Recovery Training Aid Revision 2", Nov. 1, 2008, XP055067494, http://www.faa.gov/other_visit/aviation_industry/airline_operators/training/media/AP_UpsetRecovery_Book.pdf, pp. 9 and 10 of Supplement #1, Section 2.5.5.11.11; pp. App. 3-E. 46-47.

* cited by examiner

METHOD AND SYSTEM FOR MANAGING AUTOMATIC GUIDANCE OF AN AIRCRAFT DURING A COMPLETE ENGINES FAILURE

CROSS-REFERENCE TO RELATED APPLICATIONS

This application claims priority to French Patent Application No. 1259746, filed Oct. 12, 2012, which is incorporated herein by reference in its entirety.

TECHNICAL FILED

This application pertains to a method and a system for automatic management of the guidance of an aircraft, in particular a transport aeroplane, during a complete engine failure in flight.

BACKGROUND

We know that when problems relating to the engines of an aircraft lead to complete engine failure, in addition to having zero thrust, the aircraft may lose its electrical power supply necessary for operation of its systems. In order to remedy the lack of power usually provided by the engines, the aircraft is generally provided with a dynamic air turbine of the RAT type ("Ram Air Turbine"), making it possible to supply a certain amount of power to the control systems of the aircraft. It includes propellers deployed on the exterior of the fuselage, which are set in rotation under the effect of the displacement of the aircraft and drive the said turbine. The detection of a complete failure of the engines, combined with the activation of the ram air turbine, is called a TEFO event ("Total Engine Flame Out").

However, during a TEFO event the engine thrust may be insufficient for the autopilot and the flight director to be able to correctly guide the aircraft in certain modes, in particular in level flight or when climbing.

For example, the performance of the automatic pilot system depends upon the guidance mode in which the aircraft is situated. Thus, in a guidance mode configured to make the aircraft descend with a reduced engine thrust and a fixed speed, of the OP DES type ("Open Descent"), the automatic pilot system functions correctly.

On the other hand, for guidance modes configured to maintain the altitude of the aircraft, of the ALT (altitude) type, or also to reach a higher altitude, of the ALT* type, since these two modes require a significant engine thrust the automatic pilot system may not have sufficient power to ensure the guidance. It may then be difficult for the automatic pilot system to guide the aircraft.

In the first case it is considered that the guidance mode and the automatic pilot system are compatible, whilst in the second case they may be considered incompatible.

The problem and the consequences are similar with respect to the flight director. For example, when an altitude hold is required in ALT mode, the automatic pilot system and the flight director cannot ensure the monitoring of this altitude entered via a flight control unit of the FCU type ("Flight Control Unit"), since the aircraft may not have sufficient engine thrust.

Thus, during an event of the TEFO type there are two different situations, each requiring specific actions by the pilots. In a first case corresponding to a guidance mode different from the OP DES mode, the pilots must manually disconnect the flight director if they use it in manual flight mode; and if they are in automatic pilot mode the automatic pilot system must also be disconnected manually.

On the other hand, in a second case corresponding to a guidance mode of the OP DES type, the pilots can continue to monitor the indications of the flight director in manual flight mode, or can also let the automatic pilot system continue the guidance of the aircraft if this latter is engaged.

Furthermore, when the aircraft undergoes a TEFO event, the autothrottle which controls the engine thrust can no longer ensure the management, since the engines have failed. Consequently, the autothrottle should be deactivated by the pilots in order to continue the flight, regardless of the guidance mode used, even with the OP DES mode.

Other objects, desirable features and characteristics will become apparent from the subsequent summary and detailed description, and the appended claims, taken in conjunction with the accompanying drawings and this background.

SUMMARY

For the above described situations, the course of action to be followed is notified in a procedure linked to a TEFO event which occurs very rarely but which requires an immediate response.

Also, in order to help the pilots to react quickly, the various teachings of the present disclosure provide a method and a system for managing the guidance of an aircraft, operating automatically in order to put the aircraft into a guidance configuration optimised for a problem of the TEFO type, regardless of the guidance mode or the type of piloting.

To this end, according to the present disclosure, the method of automatic management of the guidance of an aircraft during a complete failure of the engines of said aircraft is remarkable in that, in an automatic manner: A. the engines are monitored so as to be able to detect a complete failure of the engines; B. if a complete failure of the engines is detected, a check is carried out as to whether at least the following conditions are met simultaneously: the aircraft is in flight; the aircraft is in a guidance mode different from a guidance mode configured to make the aircraft descend with a reduced engine thrust and a fixed speed; and C. if the conditions set out in B are verified, guidance means of the aircraft are brought automatically into a guidance configuration compatible with the situation associated with the complete failure of the engines.

Thus, by means of the various teachings of the present disclosure the aircraft is immediately and automatically controlled in a guidance configuration adapted to a situation of the TEFO type. The pilots do not need to follow a procedure requiring manual operation which would take time.

The process makes it possible in particular to have a guidance configuration adapted to the guidance mode of the aircraft during the TEFO event. As the operations to be performed are not necessarily the same depending upon the mode, the method provides an optimal solution for each situation, as specified below.

Advantageously, the autothrottle is disengaged automatically since, as is explained above, the engine thrust of the aircraft is substantially zero in a TEFO event. This disengagement is systematic for all guidance modes, as soon as the detection of a TEFO event is verified.

In one exemplary embodiment, in B, a check is also carried out as to whether at least one of the following elements of the aircraft is engaged: an automatic pilot system and a flight director; and in C, the automatic pilot system and/or the flight director is disengaged.

The method comprises, in one example, ensuring that the guidance mode and the automatic pilot system and/or the flight director are compatible in order to guide the aircraft correctly after the detection in flight of a TEFO event. For this, a check is carried out as to whether at least one of the following elements of the aircraft is engaged: the automatic pilot system and the flight director. These two systems may pose problems of reliability.

Moreover, a check is carried out simultaneously as to whether the aircraft is in a different guidance mode from a guidance mode (of the OP DES type) configured to make the aircraft descend with a reduced engine thrust and a fixed speed. In fact, since the mode of OP DES type is compatible with the use of an automatic pilot system and/or a flight director, the aircraft is already in an optimal guidance configuration with this mode, such that no specific action is necessary. In the contrary case, when all the required conditions are verified the method makes it possible to change the guidance configuration to a compatible configuration.

Consequently, for a piloting mode which was automatic at the moment of the TEFO event, the piloting mode becomes manual. On the other hand, for a piloting mode which was manual at the moment of the detection of the TEFO event, but which was functioning with the aid of the flight director, the piloting mode remains manual, but the flight director is disengaged, since it is no longer sufficiently reliable.

Generally, any subsequent disengagement of the automatic pilot system and/or the flight director is inhibited, after a first disengagement. This characteristic allows the pilot to re-engage the automatic pilot system and/or the flight director after a first disengagement. In fact, if a pilot wishes to continue to use the flight director and/or the piloting system, he is able to do so without causing a new disengagement. He could for example guide the aircraft in manual flight mode whilst retaining the aid of the flight director, even if this latter is less reliable.

In the event of re-engagement of at least one of these systems, the guidance modes of the aircraft are basic modes of the VS/FPA type ("Vertical Speed/Flight Path Angle") or also of the HDG/TRK type ("Heading/Track"). As they are different from the OP DES mode, the disengagement would produce again if this latter were not inhibited. The pilot can then change the guidance mode in order to have a compatible mode of the OP DES type.

In one embodiment, the automatic re-engagement of the flight director is prevented during a predetermined period after a disengagement. In fact, usually, when a disengagement of the automatic pilot system and the flight director occurs, this latter is re-engaged automatically in a basic guidance mode of the VS/FPA or HDG/TRK type. The flight director must remain disengaged, at least initially, until the pilot decides to re-engage it himself Consequently, the automatic re-engagement is inhibited in this particular alternative embodiment.

According to another embodiment, in C, the guidance mode of the aircraft is changed to a guidance mode configured to make the aircraft descend, with a reduced engine thrust and a fixed speed. Thus, unlike the aforementioned exemplary embodiment, instead of disengaging the automatic pilot system and/or the flight director, according to this embodiment the guidance mode is changed to a guidance mode of the OP DES type which is compatible with the two systems referred to above, as these latter remain engaged during a TEFO event.

By means of this exemplary embodiment the aircraft is automatically configured to enable pilots to guide it without changing the piloting mode. Thus, the aircraft remains in automatic piloting mode if such was the case at the moment of the TEFO event, or also the pilot can continue to rely on the flight director if it is in manual flight mode.

Generally, a target altitude and a target speed are defined, since the aircraft must start a descent at a certain speed, in OP DES mode.

Advantageously, the target guidance altitude is adapted to the relief of the terrain below the aircraft. In fact, the relief of the terrain should be taken into account in order to prevent the aircraft from approaching too close to said relief.

Also, advantageously, the aircraft is guided in such a way as to avoid cutting off the routes of lower flight levels. In order to prevent any risk of collision with another aircraft travelling at a lower altitude, the flight path is calculated in such a way as to avoid the routes usually taken by these aircraft. Thus, the aircraft carries out maneuver of circumventing these routes during the descent.

In the two exemplary embodiments set out above, checks are also carried out, advantageously in B, as to whether the ram air turbine is activated, and C is only implemented when this latter condition is likewise met.

Generally, the transmission of the detection of the activation of the ram air turbine is delayed in order to enable the aircraft to be stabilised. In fact, during the transitional phase of deployment of the turbine and the time that this latter delivers electrical power, the actuators are no longer supplied, which affects the aerodynamics of the aircraft to the point of causing interference. Consequently, it is desirable to wait until the aircraft is stabilised and the actuators are supplied and stabilised again before changing the guidance configuration.

The present disclosure also relates to a system for automatic management of the guidance of an aircraft during a complete engine failure of said aircraft.

According to the various teachings of the present disclosure, said system is remarkable in that it includes: means for monitoring the engines so as to be able to detect a complete failure of the engines; means for detecting whether the aircraft is in flight; means for detecting whether the aircraft is in a guidance mode different from a guidance mode configured to make the aircraft descend with a reduced engine thrust and a fixed speed; and control means for automatically bringing the guidance means of the aircraft are brought automatically into a guidance configuration compatible with the situation associated with the complete failure of the engines.

In one embodiment, said system includes means for detecting whether at least one of the following elements of the aircraft is engaged: an automatic pilot system and a flight director; and said control means are formed in such as way as to disengage the automatic pilot system and/or the flight director.

Furthermore, in another embodiment, said control means are formed in such a way as to change the guidance mode of the aircraft to a guidance mode configured to make the aircraft descend, with a reduced engine thrust and a fixed speed.

In these two exemplary embodiments, the system also comprises means for disengaging the autothrottle.

Thus, this system implements the method according to the various teachings of the present disclosure. It makes it possible in particular to obtain the same advantages, for these two exemplary embodiments, as those described in the part of the description relating to the method.

The present disclosure further relates to an aircraft comprising a system according to the various teachings.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
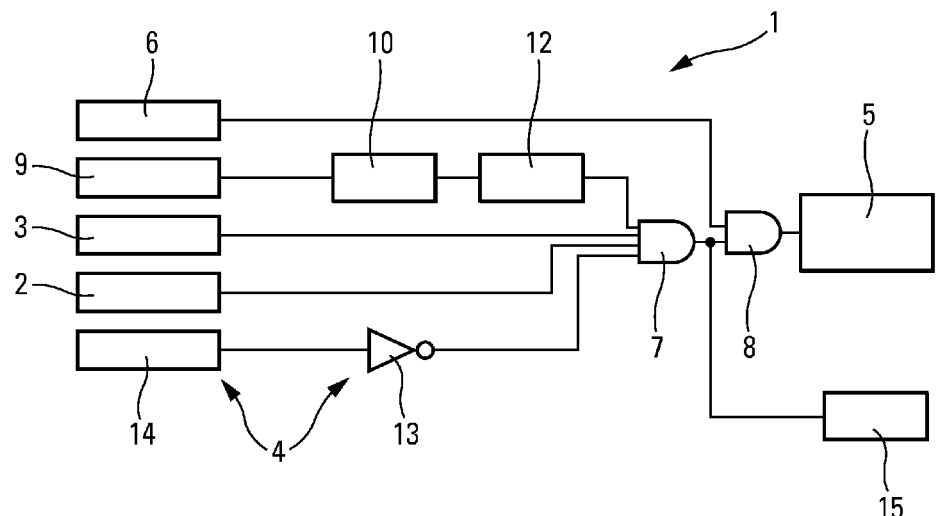
FIG. 1 shows a block diagram of a system for automatic management of the guidance according to various embodiments.

In FIG. 1, the system for automatic management of the guidance of an aircraft during a complete engine failure of said aircraft, according to one exemplary embodiment, includes: means 2 for monitoring the engines so as to be able to detect a complete failure of the engines, of the TEFO event type; means 3 for detecting whether the aircraft is in flight; means 4 for detecting whether the aircraft is in a guidance mode different from a guidance mode of the OP DES type configured to make the aircraft descend with a reduced engine thrust and a fixed speed; means 6 for detecting whether at least one of the following elements (not shown) is engaged: an automatic pilot system and a flight director; and control means 5 capable of automatically bringing the guidance means of the aircraft into a guidance configuration compatible with the situation associated with the complete failure of the engines.

The detection means 2, 3 and 4 are connected to the input of a first logic gate 7. This first logic gate 7 is of the AND type, that is to say that it transmits the information pertaining to the detections at its output, subject to all the detections being verified.

The means 4 for detection of a guidance mode different from a guidance mode of the OP DES type, comprise in particular a logic gate 13 of the NOT type which transmits at the output information which is the opposite of that which appears at the input thereof, and of a detector 14 of the engagement of the guidance mode of the OP DES type. The information transmitted to the first logic gate 7 by the detector 14 is therefore inverted. Thus, if the OP DES mode is used, the information transmitted is zero; in the contrary case, the detection is transmitted.

The output of the first logic gate 7 is connected to a second logic gate 8 of the AND type, and also to a data recording system 15. The data recording system 15 is intended for the maintenance of the aircraft, in particular in order to record the occurrence of the events detected by the detection means connected to the first logic gate 7.

The input of the second logic gate 8 is also connected to the means 6 for detecting whether the automatic pilot system and/or the flight director is engaged. This condition is added to those of the first logic gate 7 in order to cause the disengagement of these systems by the control means 5, the output of the second logic gate 8 being connected to said control means 5.

The addition of a second logic gate 8 makes it possible to separate the detection of the engagement of the automatic pilot system and/or the flight director from the detection of the other events. Thus the recording in the database 15 only relates to the part of the events detected at the input of the first logic gate 7.

To summarise, when all the detection conditions are verified at the input of the first logic gate 7, it transmits the information to the second logic gate 8. If at the same time the detection of the engagement of the automatic pilot system and/or the flight director is verified the second logic gate 8 transmits the information to the control means 5.

In this case, the control means 5 orders the disengagement of the automatic pilot system and the flight director.

Thus, by virtue of the system 1, the guidance configuration is automatically rendered compatible with a guidance mode different from a mode of the OP DES type during an event of the TEFO type. The aircraft may therefore be appropriately guided by the pilots, in a manual flight mode.

Moreover, the control means 5 are also capable of ordering the disengagement of the autothrottle which can no longer manage the thrust of the engines as these have failed.

Furthermore, the system 1 comprises means 9 for detection of the activation of the ram air turbine. These detection means 9 are likewise connected to the input of the first logic gate 7 in order to define an additional condition of activation of the control means 5.

Advantageously, the transmission of the detection of the activation of the ram air turbine by the detection means 9 can be delayed by an electronic time shift means 10. This time shift may last for example for several seconds, in order to ensure the stabilisation of the aircraft after the turbine has been deployed. The electronic time shift means 10 is disposed between the means 9 for detection of the activation of the ram air turbine and the first logic gate 7.

Thus, the change of guidance configuration occurs once the aircraft is stabilised, following the stabilisation of the control surfaces.

Furthermore, the system 1 likewise includes a means 12 for inhibiting the disengagement of the automatic pilot system and/or the flight director. The inhibiting means 12 can comprise an element which transmits information in the form of an electrical pulse at the output. In this way, when said inhibiting means 12 receives information at the input it transmits it during a very short time. In this way, even if it receives the same information continuously at the input, it is only relayed for an instant by the electrical pulse. After a pulse, the transmission no longer takes place.

Said inhibiting means 12 is arranged between the means 9 for detection of the activation of the ram air turbine and the input of the first logic gate 7.

Figure 2:
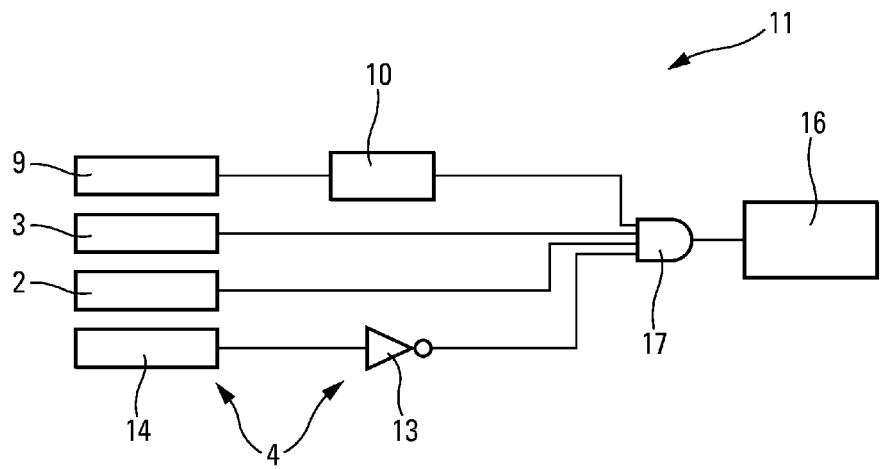
FIG. 2 shows a block diagram of a system for automatic management of the guidance according to various embodiments.

In FIG. 2, which shows a second embodiment, the system 11 for automatic management of the guidance of an aircraft during a complete engine failure comprises: means 2 for monitoring the engines so as to be able to detect a complete failure of the engines, of the TEFO event type; means 3 for detecting whether the aircraft is in flight; means 4 for detecting whether the aircraft is in a guidance mode different from a guidance mode of the OP DES type configured to make the aircraft descend with a reduced engine thrust and a fixed speed; and control means 16 for automatically bringing the guidance means of the aircraft into a guidance configuration compatible with the situation associated with the complete failure of the engines.

In this exemplary embodiment, said control means 16 order the change of guidance mode of the aircraft to a guidance mode configured to make the aircraft descend, with a reduced engine thrust and a fixed speed, that is to say a mode of the OP DES type.

Thus, the guidance configuration is rendered compatible with the event of the TEFO type, in order to be able to pilot the aircraft correctly. This system 11 makes it possible in particular to retain an automatic piloting mode, or also to keep the aid of the flight director in operation, in order to assist a manual piloting mode, during an event of the TEFO type.

Moreover, the control means 16 are also capable of ordering the disengagement of the autothrottle which can no longer manage the thrust of the engines as these have failed.

In this exemplary embodiment, it is not necessary to verify that the engagement of the automatic pilot system and/or the flight director is effective to enable the activation of the control means 16. In fact, the guidance mode of the OP DES type cannot function unless at least one of the two systems is engaged. Thus, if the order of change of the guidance mode is given by the control means 16, since none of these systems is engaged, the order is inoperable.

The detection means 2, 3 and 4 are connected to the input of a first logic gate 17 which is also of the AND type.

In the same way as for the previous exemplary embodiment, the means 4 for detection of a guidance mode of the OP DES type comprise a detector 14 of engagement of the guidance mode of the OP DES type, followed by a logic gate 13 of the NOT type. Thus, the logic gate 17 is informed of the detection of a guidance mode different from a mode of the OP DES type.

As the aircraft descends in this guidance mode, the control means 16 define a target altitude towards which the aircraft is guided, and also a speed of displacement.

Generally, the control means 16 order the calculation of the target altitude adapted to the relief of the land below the aircraft. To this end, the control means 16 are in relation to a system for measuring the minimal altitude of the route to be followed, of the MORA type ("Minimum Off Route Altitude"), which is responsible for calculating a suitable target altitude.

Furthermore, the control means 16 order a guidance of the aircraft making it possible to follow a trajectory calculated in such a way as to avoid cutting off the routes of lower flight levels.

Furthermore, the system 11 also includes means 9 for detection of the activation of the ram air turbine. These detection means 9 are likewise connected to the input of the logic gate 17 in order to define an additional condition of transmission to the control means 16.

Advantageously, the transmission of the detection of the activation of the ram air turbine by the detection means 9 can be delayed by an electronic time shift means 10. This shift may last for example for several seconds, in order to ensure the stabilisation of the aircraft after the turbine has been deployed. The electronic time shift means 10 is disposed between the means 9 for detection of the activation of the ram air turbine and the logic gate 17.

Thus, the change of guidance configuration occurs once the aircraft is stabilised, following the stabilisation of the control surfaces.

The two exemplary embodiments of the systems 1 and 11 for automatic management of the guidance of an aircraft during a complete engine failure, shown in FIGS. 1 and 2 each enable the implementation of one of the exemplary embodiments of the corresponding method, as set out above.

The systems 1 and 11 for automatic management of the guidance of an aircraft during a complete engine failure of said aircraft can also be integrated in a primary calculator of said aircraft.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A method for automatic management of the guidance of an aircraft during a complete engine failure of said aircraft, wherein the aircraft includes one or more engines, comprising:
   monitoring one or more engines of the aircraft to detect a complete failure of all of said one or more engines;
   if a complete failure of all of the one or more engines is detected, determining whether at least the following conditions are met simultaneously:
   the aircraft is in flight; and
   the aircraft is in a guidance mode different from a guidance mode configured to make the aircraft descend with a reduced engine thrust and a fixed speed;
   if the conditions are verified, automatically changing, with a processor, a guidance mode of the aircraft into a guidance configuration compatible with the situation associated with the complete failure of the one or more engines; and
   if the complete failure of all of the one or more engines is detected, the method further comprises:
   determining that at least one of the following elements of the aircraft is engaged: an automatic pilot system and a flight director;
   in response to determining that at least one of the automatic pilot system and the flight director is engaged, disengaging the at least one of the automatic pilot system and the flight director; and
   inhibiting any subsequent disengagement of the at least one of the automatic pilot system and the flight director, after the disengaging and following a re-engagement of the at least one of the automatic pilot system and the flight director.

2. The method according to claim 1, further comprising disengaging an autothrottle.

3. The method according to claim 1, further comprising preventing automatic re-engagement of the flight director during a predetermined period after a disengagement.

4. The method according to claim 1, wherein the guidance mode of the aircraft is changed to a guidance mode configured to make the aircraft descend, with a reduced engine thrust and a fixed speed.

5. The method according to claim 4, wherein a target guidance altitude is adapted to a relief of a terrain below the aircraft.

6. The method according to claim 4, wherein the aircraft is guided in such a way as to avoid cutting off routes of lower flight levels.

7. The method according to claim 1, further comprising determining whether the following condition is likewise met: a ram air turbine is activated.

8. The method according to claim 7, wherein the transmission of the detection of the activation of the ram air turbine is delayed in order to enable the aircraft to be stabilised.

9. A system for automatic management of the guidance of an aircraft during a complete engine failure of said aircraft, the aircraft having one or more engines, comprising:
   means for monitoring all of the one or more engines of the aircraft so as to be able to detect a complete failure of said engines;
   means for detecting whether the aircraft is in flight;
   means for detecting whether the aircraft is in a guidance mode different from a guidance mode configured to make the aircraft descend with a reduced engine thrust and a fixed speed;
   control means, including a processor, for automatically bringing the guidance means of the aircraft into a guidance configuration compatible with the situation associated with the complete failure of the engines; and
   means for detecting whether at least one of the following elements is engaged: an automatic pilot system and a flight director;
   wherein said control means disengages at least one of the automatic pilot system and the flight director if engaged; and
   wherein said control means inhibits any subsequent disengagement of the at least one of the automatic pilot system and the flight director, after the disengaging and following a re-engagement of the at least one of the automatic pilot system and the flight director.

10. The system according to claim 9, wherein said control means are formed in such a way as to change the guidance mode of the aircraft to a guidance mode configured to make the aircraft descend, with a reduced engine thrust and a fixed speed.

11. The system according to claim 9, further comprising means for disengaging the autothrottle.

12. An aircraft, comprising:
   a system for automatic management of a guidance mode of the aircraft during a complete engine failure of the aircraft, wherein the aircraft has one or more engines, the system including:
   means for monitoring all of the one or more engines of the aircraft so as to be able to detect a complete failure of said engines;
   means for detecting whether the aircraft is in flight;
   means for detecting whether the aircraft is in a guidance mode different from a guidance mode configured to make the aircraft descend with a reduced engine thrust and a fixed speed;
   control means, including a processor, for automatically bringing the guidance means of the aircraft into a guidance configuration compatible with the situation associated with the complete failure of the engines; and
   means for detecting whether at least one of the following elements is engaged: an automatic pilot system and a flight director;
   wherein said control means disengages at least one of the automatic pilot system and the flight director if engaged; and
   wherein said control means inhibits any subsequent disengagement of the at least one of the automatic pilot system and the flight director, after the disengaging and following a re-engagement of the at least one of the automatic pilot system and the flight director.

13. The aircraft according to claim 12, wherein said control means are formed in such a way as to change the guidance mode of the aircraft to a guidance mode configured to make the aircraft descend, with a reduced engine thrust and a fixed speed.

14. The aircraft according to claim 12, further comprising means for disengaging the autothrottle.

* * * * *